(12) United States Patent
Kubo et al.

(10) Patent No.: US 12,030,496 B2
(45) Date of Patent: Jul. 9, 2024

(54) VEHICLE CONTROL SYSTEM

(71) Applicant: SUBARU CORPORATION, Tokyo (JP)

(72) Inventors: Tatsuhiro Kubo, Tokyo (JP); Fumiyuki Moriya, Tokyo (JP); Takumi Hoshi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 293 days.

(21) Appl. No.: 17/534,569

(22) Filed: Nov. 24, 2021

(65) Prior Publication Data

US 2022/0176964 A1 Jun. 9, 2022

(30) Foreign Application Priority Data

Dec. 4, 2020 (JP) ................. 2020-201649

(51) Int. Cl.
*B60W 30/18* (2012.01)
*B60W 10/06* (2006.01)
(Continued)

(52) U.S. Cl.
CPC ...... *B60W 30/18118* (2013.01); *B60W 10/06* (2013.01); *B60W 10/08* (2013.01);
(Continued)

(58) Field of Classification Search
CPC .......... B60W 30/18118; B60W 10/06; B60W 10/08; B60W 10/184; B60W 30/18127;
(Continued)

(56) References Cited

U.S. PATENT DOCUMENTS

2004/0012250 A1 1/2004 Kuno et al.
2015/0066326 A1* 3/2015 Furuyama ............... B60T 7/042
303/10

(Continued)

FOREIGN PATENT DOCUMENTS

| JP | 2003-182404 A | 7/2003 |
|---|---|---|
| JP | 2010-280239 A | 12/2010 |
| JP | 2017-177870 A | 10/2017 |

*Primary Examiner* — Navid Z. Mehdizadeh
*Assistant Examiner* — Shelley Marie Osterhout
(74) *Attorney, Agent, or Firm* — TROUTMAN PEPPER HAMILTON SANDERS LLP

(57) ABSTRACT

A vehicle control system includes a target driving force calculator that calculates a target driving force of a vehicle, an arithmetic operator that calculates a request driving force and a request braking force, and a stop keeping processor that keeps the vehicle in a stopped state by increasing a brake fluid pressure so that a braking force becomes equal to or larger than a stop keeping braking force. The arithmetic operator executes a pressure pre-increasing process for pre-increasing the brake fluid pressure before a stop timing and setting, as the request driving force, a cancellation driving force for canceling a braking force for pressure pre-increase, and controls, in the pressure pre-increasing process, the request braking force so that the braking force for the pressure pre-increase is increased within a range in which the braking force does not exceed a braking force threshold smaller than the stop keeping braking force.

20 Claims, 9 Drawing Sheets

(51) Int. Cl.
*B60W 10/08* (2006.01)
*B60W 10/184* (2012.01)

(52) U.S. Cl.
CPC .... *B60W 10/184* (2013.01); *B60W 30/18127* (2013.01); *B60W 2520/04* (2013.01); *B60W 2520/105* (2013.01); *B60W 2540/12* (2013.01); *B60W 2552/15* (2020.02)

(58) Field of Classification Search
CPC ......... B60W 2520/04; B60W 2552/15; B60W 2520/105; B60W 2540/12
See application file for complete search history.

(56) References Cited

U.S. PATENT DOCUMENTS

2016/0375884 A1* 12/2016 Farres ................... B60T 13/683
 701/70
2020/0039316 A1* 2/2020 Belter ................ B60G 17/0195

* cited by examiner

VEHICLE CONTROL SYSTEM

CROSS-REFERENCE TO RELATED APPLICATION

The present application claims priority from Japanese Patent Application No. 2020-201649 filed on Dec. 4, 2020, the entire contents of which are hereby incorporated by reference.

BACKGROUND

The disclosure relates to a vehicle control system for a vehicle having a stop keeping function for keeping a stop of the vehicle. In particular, the disclosure relates to a technical field about control on a brake fluid pressure immediately before the stop.

There is known a vehicle having a stop keeping function for causing a stopped vehicle to keep its stopped state. The stop keeping function is exerted when stopping a vehicle by a speed control function for a vehicle following a preceding vehicle, such as adaptive cruise control (ACC), and by a one-pedal function (function of accelerating or decelerating a vehicle based on an operation for one pedal).

In the stop keeping function, a brake fluid pressure higher than a stopping brake fluid pressure may be applied due to, for example, a constraint on a mechanism that keeps the brake fluid pressure. The stopping fluid pressure may be increased to a fluid pressure that enables the stop keeping function.

Japanese Unexamined Patent Application Publication (JP-A) Nos. 2003-182404, 2010-280239, and 2017-177870 are examples of related art.

JP-A No. 2003-182404 discloses a control device for an electric vehicle stopping at a slope. Power consumption of an electric motor is reduced when the electric vehicle is being stopped at the slope with the electric motor generating a driving torque.

JP-A No. 2010-280239 discloses control on a braking force for keeping a vehicle in a stopped state. A driving force for canceling an excess braking force is calculated.

JP-A No. 2017-177870 discloses a technology relating to a brake control system. This technology reduces actuation noise and power consumption in an actuation fluid supply unit when keeping a fluid pressure of a brake actuation fluid.

SUMMARY

An aspect of the disclosure provides a vehicle control system for a vehicle including either one of an engine and a motor as a drive source of wheels of the vehicle. The vehicle control system includes a target driving force calculator, an arithmetic operator, and a stop keeping processor. The target driving force calculator is configured to calculate a target driving force of the vehicle. The arithmetic operator is configured to calculate, based on the target driving force, a request driving force to be used for controlling drive of either one of the engine and the motor, and a request braking force to be used for controlling a hydraulic brake. The stop keeping processor is configured to execute, when a stopping braking force that is the request braking force at a stop timing is not equal to or larger than a stop keeping braking force that keeps the vehicle in a stopped state, a process of keeping the vehicle in the stopped state by increasing a brake fluid pressure so that a braking force becomes equal to or larger than the stop keeping braking force. The arithmetic operator is configured to execute a pressure pre-increasing process for pre-increasing the brake fluid pressure before the stop timing and setting, as the request driving force, a cancellation driving force for canceling a braking force for pressure pre-increase. The arithmetic operator is configured to control, in the pressure pre-increasing process, the request braking force so that the braking force for the pressure pre-increase is increased within a range in which the braking force does not exceed a braking force threshold smaller than the stop keeping braking force.

An aspect of the disclosure provides a vehicle control system for a vehicle including either one of an engine and a motor as a drive source of wheels of the vehicle. The vehicle control system includes circuitry. The circuitry is configured to calculate a target driving force of the vehicle. The circuitry is configured to calculate, based on the target driving force, a request driving force to be used for controlling drive of either one of the engine and the motor, and a request braking force to be used for controlling a hydraulic brake. The circuitry is configured to execute, when a stopping braking force that is the request braking force at a stop timing is not equal to or larger than a stop keeping braking force that keeps the vehicle in a stopped state, a process of keeping the vehicle in the stopped state by increasing a brake fluid pressure so that a braking force becomes equal to or larger than the stop keeping braking force. The circuitry is configured to execute a pressure pre-increasing process for pre-increasing the brake fluid pressure before the stop timing and setting, as the request driving force, a cancellation driving force for canceling a braking force for pressure pre-increase. The circuitry is configured to control, in the pressure pre-increasing process, the request braking force so that the braking force for the pressure pre-increase is increased within a range in which the braking force does not exceed a braking force threshold smaller than the stop keeping braking force.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In recent years, an electrically controlled booster has become mainstream in place of a negative pressure booster as a brake booster that controls a brake fluid pressure. When the electrically controlled booster increases the brake fluid pressure at the time of stopping a vehicle, actuation noise and vibration of a motor may cause user's discomfort.

To reduce the discomfort caused by the actuation noise and vibration of the motor along with the increase in the fluid pressure at the time of keeping the stop, the brake fluid pressure may be pre-increased immediately before the stop to reduce the amount of increase in the fluid pressure by a stop keeping function.

When pre-increasing the fluid pressure before the stop, it is desirable to output a driving force for canceling the amount of pre-increase in the fluid pressure. To reduce the actuation noise and vibration of the motor at the time of keeping the stop, it is desirable to increase the fluid pressure pre-increase amount as appropriate. In this case, the driving force for canceling the pre-increase amount increases, thereby causing a decrease in either one of fuel efficiency and electricity efficiency.

It is desirable to improve Noise Vibe (NV) performance in the stop keeping function of the vehicle while suppressing the decrease in either one of the fuel efficiency and the electricity efficiency.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
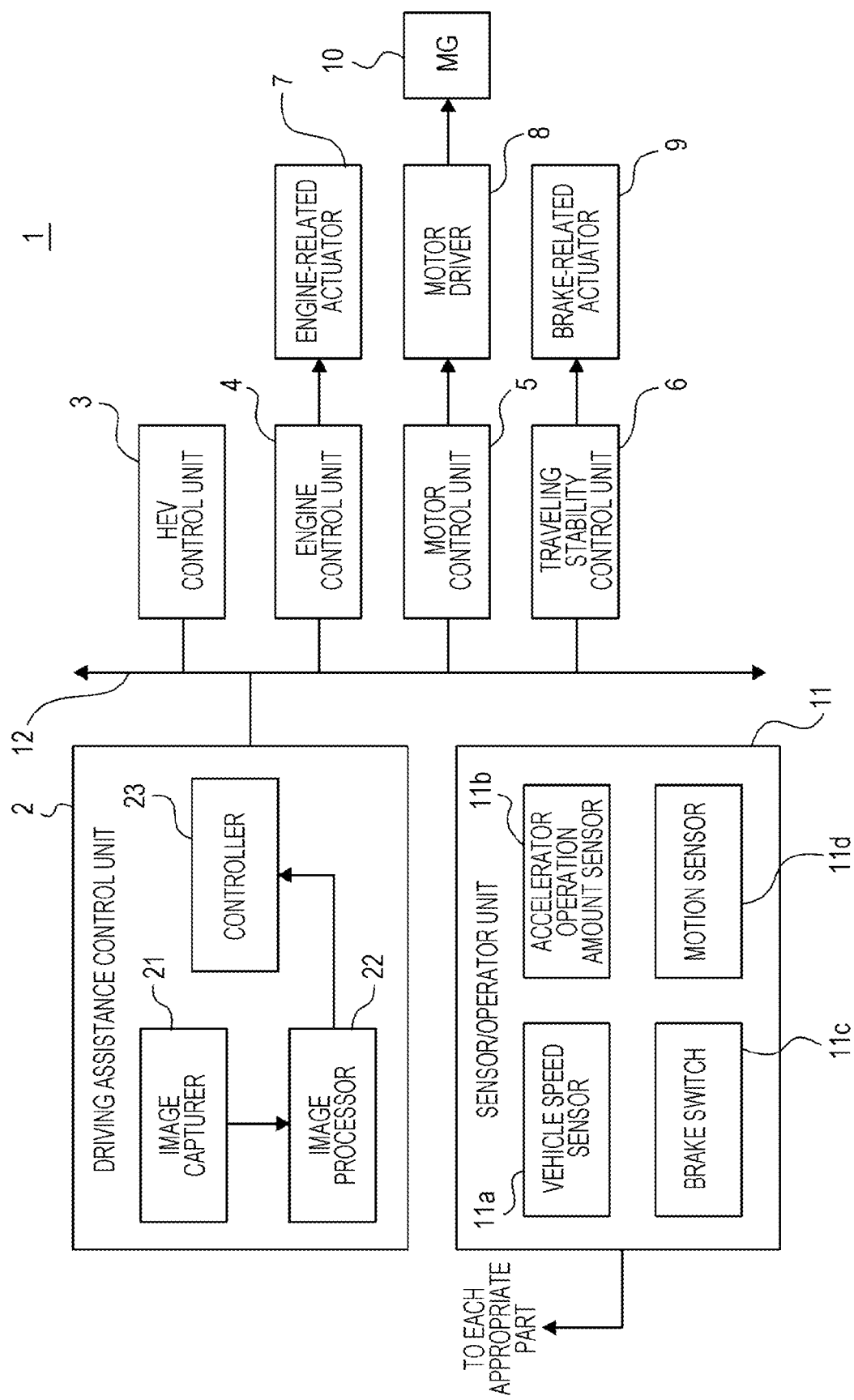
FIG. 1 is a block diagram illustrating a schematic configuration of a vehicle control system according to an embodiment of the disclosure.

FIG. 1 is a block diagram illustrating a schematic configuration of a vehicle control system 1 according to the embodiment of the disclosure. In FIG. 1, focus is put on a main part of the configuration of the vehicle control system 1 according to the embodiment of the disclosure.

The vehicle control system 1 of the embodiment is provided in a hybrid electric vehicle (HEV) including an engine and a motor generator (MG 10 described later) as drive sources of wheels.

As illustrated in FIG. 1, the vehicle control system 1 includes a driving assistance control unit 2, an HEV control unit 3, an engine control unit 4, a motor control unit 5, a traveling stability control unit 6, an engine-related actuator 7, a motor driver 8, a brake-related actuator 9, the motor generator (MG) 10, a sensor/operator unit 11, and a bus 12.

The driving assistance control unit 2 includes an image capturer 21, an image processor 22, and a controller 23, and executes various control processes for driving assistance (hereinafter referred to as "driving assistance control processes").

The image capturer 21 captures images of areas in a traveling direction of a driver's vehicle (ahead of the vehicle in this example) to obtain captured image data.

In this example, the image capturer 21 includes two cameras. Each camera includes a camera optical system and an imaging element such as a charge coupled device (CCD) and a complementary metal oxide semiconductor (CMOS). In each camera, the camera optical system forms an image of a subject on an imaging plane of the imaging element to obtain an electric signal for each pixel depending on received light intensity. Each camera can measure a distance by so-called stereoscopic imaging. The electric signal obtained by each camera undergoes analog/digital (A/D) conversion and predetermined correction to become a digital image signal (captured image data) indicating a brightness value on a predetermined gray scale for each pixel. The digital image signal is supplied to the image processor 22.

The image processor 22 includes either one of a digital signal processor (DSP) and a microcomputer including a central processing unit (CPU), a read only memory (ROM), and a random access memory (RAM). The image processor 22 executes predetermined image processing related to recognition of an external environment based on the captured image data obtained by the image capturer 21.

In one example, the image processor 22 executes various types of image processing based on each piece of captured image data obtained by stereoscopic imaging, recognizes information on an area ahead of the driver's vehicle, such as data on three-dimensional objects ahead of the vehicle and data on lane lines, and estimates a driver's vehicle traveling lane based on the recognized information. The image processor 22 detects a preceding vehicle on the driver's vehicle traveling lane based on the data on the recognized three-dimensional objects.

In one example, the image processor 22 executes the following process based on each piece of captured image data obtained by stereoscopic imaging. First, distance information is generated by the principle of triangulation based on a deviation of corresponding positions (parallax) on a pair of captured images indicated by each piece of captured image data. The distance information undergoes known grouping, and the grouped distance information is compared with prestored three-dimensional road shape data and three-dimensional object data, thereby extracting lane line data, side wall data indicating guardrails and curbstones along roads, and three-dimensional object data indicating vehicles. The image processor 22 estimates a driver's vehicle traveling lane based on the lane line data and the side wall data, and extracts (detects), as a preceding vehicle, a three-dimensional object located on the driver's vehicle traveling lane and moving at a predetermined speed (for example, 0 Km/h or higher) in a direction substantially identical to the direction of the driver's vehicle.

When any preceding vehicle is detected, a vehicle-to-vehicle distance cd (distance from the driver's vehicle), a relative speed ds (rate of change in the vehicle-to-vehicle distance cd), a preceding vehicle speed ss (relative speed ds+driver's vehicle speed js), and a preceding vehicle acceleration sac (derivative of the preceding vehicle speed ss) are calculated as preceding vehicle information.

The driver's vehicle speed js is a traveling speed of the driver's vehicle that is detected by a vehicle speed sensor 11a described later (may be referred to as "actual vehicle speed" in relation to a set vehicle speed St described later). The image processor 22 recognizes, as a preceding vehicle substantially in a stopped state, a preceding vehicle that does not accelerate and has its preceding vehicle speed ss equal to or lower than a predetermined value (for example, 4 Km/h or lower).

For example, the image processor 22 calculates pieces of preceding vehicle information for individual frames of the captured image data, and sequentially stores the calculated pieces of preceding vehicle information.

The controller 23 includes a microcomputer including a CPU, a ROM, and a RAM, and executes the driving assistance control processes based on a result of image processing executed by the image processor 22, detection information obtained by the sensor/operator unit 11, and operation input information.

The controller 23 is coupled via the bus 12 to the HEV control unit 3, the engine control unit 4, the motor control unit 5, and the traveling stability control unit 6 each including a microcomputer to communicate data with those control units. The controller 23 instructs any appropriate control unit to execute operations related to the driving assistance.

The controller 23 executes automatic cruise control as one of the driving assistance control processes. That is, the controller 23 controls the speed of the driver's vehicle to satisfy a specified traveling condition. In this example, the controller 23 executes a process for adaptive cruise control (ACC) as the automatic cruise control.

In the ACC, a target vehicle speed St and a target vehicle-to-vehicle distance Dt are set based on an operation input by a predetermined operator in the sensor/operator unit 11. In this example, the driver can select any vehicle-to-vehicle distance mode from among three vehicle-to-vehicle distance modes "long", "medium", and "short" through the operation, and the controller 23 sets different target vehicle-to-vehicle distances Dt for individual selected modes based on the driver's vehicle speed js.

The "target vehicle speed St" is hereinafter referred to as "set vehicle speed St".

When no preceding vehicle is detected during the ACC, the controller 23 executes constant speed traveling control for converging the driver's vehicle speed js on the set vehicle speed St.

When any preceding vehicle is recognized during the constant speed traveling control, the controller 23 executes follow-traveling control for converging a vehicle-to-vehicle distance cd from the preceding vehicle on the target vehicle-to-vehicle distance Dt. In this example, the controller 23 controls start and stop of the follow of the preceding vehicle as the follow-traveling control. That is, the controller 23 causes the driver's vehicle to stop in response to a stop of the preceding vehicle and then follow the preceding vehicle in response to a start of the preceding vehicle.

During the ACC, the controller 23 calculates target driving forces for the constant speed traveling control and the follow-traveling control.

In a state other than the ACC (acceleration and deceleration of the vehicle are controlled based on driver's operations for an accelerator and a brake), the controller 23 calculates the target driving force based on the driver's operations for the accelerator and the brake.

The target driving force is calculated as a value exhibiting a difference in polarity between acceleration and deceleration. For example, the target driving force takes a positive value for acceleration and a negative value for deceleration.

In this example, the controller 23 calculates a request driving force and a request braking force based on the calculated target driving force. The request driving force is a driving force of the vehicle that is requested to achieve the target driving force. In the vehicle of this example that includes the engine and the MG 10 as the drive sources of the wheels, the controller 23 calculates a total driving force for the engine and the MG 10.

The request braking force is a braking force requested to achieve the target driving force.

In the case of the HEV, braking devices of the vehicle include a regenerative brake using regeneration in the MG 10 in addition to a hydraulic brake mechanism such as a disc brake. Therefore, the request driving force as well as the request braking force is calculated during deceleration of the vehicle to achieve a decelerated state based on the calculated target driving force.

In this example, the controller 23 can set a comfort mode and an ECO mode as modes related to the vehicle control. The comfort mode focuses on occupant's comfort. The ECO mode focuses on either one of fuel efficiency and electricity efficiency. In this example, the controller 23 sets either one of the comfort mode and the ECO mode based on an operation input by the occupant.

In this example, as a pressure pre-increasing process for increasing a brake fluid pressure by a stop keeping function described later, the controller 23 executes a process for improving Noise Vibe (NV) performance and suppressing a decrease in either one of the fuel efficiency and the electricity efficiency. This process is described later.

The sensor/operator unit 11 includes various sensors and operators in the driver's vehicle. The sensor/operator unit 11 includes the vehicle speed sensor 11a that detects a driver's vehicle speed js, an accelerator operation amount sensor 11b that detects an accelerator operation amount based on an amount of depression of an accelerator pedal, a brake switch 11c to be turned ON or OFF based on whether a brake pedal is operated, and a motion sensor 11d that includes an acceleration sensor and an angular velocity sensor and detects motion of the driver's vehicle.

Although illustration is omitted, the sensor/operator unit 11 includes an engine speed sensor that detects an engine speed, an intake air amount sensor that detects an amount of intake air to the engine, a throttle opening degree sensor that detects an opening degree of a throttle valve provided in an intake passage to adjust the amount of intake air to be supplied to each cylinder of the engine, a coolant temperature sensor that detects a coolant temperature indicating a temperature of the engine, an outside air temperature sensor that detects a temperature outside the vehicle, and a gradient sensor that detects a gradient of a driver's vehicle traveling lane.

Examples of the operators include a start switch that gives an instruction to start or stop the vehicle control system 1, and an operator for operations related to the ACC. Examples of the operators also include an operator to be used for setting either one of the comfort mode and the ECO mode.

The HEV control unit 3 controls operations of the vehicle by giving instructions to the engine control unit 4 and the motor control unit 5 based on the request driving force calculated by the controller 23 of the driving assistance control unit 2.

The HEV control unit 3 calculates an engine request driving force that is a driving force requested in the engine and a motor request driving force that is a driving force requested in the MG 10 based on the request driving force input from the controller 23, and sends the engine request driving force to the engine control unit 4 and the motor request driving force to the motor control unit 5.

The engine control unit 4 controls various actuators provided as the engine-related actuator 7 based on the engine request driving force sent from the HEV control unit 3. The engine-related actuator 7 includes various actuators related to engine drive, such as a throttle actuator that drives the throttle valve and an injector that injects fuel.

The engine control unit 4 controls engine power by controlling fuel injection timings, fuel injection pulse widths, and a throttle opening degree based on the engine request driving force. The engine control unit 4 can control the start and stop of the engine.

The motor control unit 5 controls operations of the MG 10 by controlling the motor driver 8 based on the motor request driving force sent from the HEV control unit 3. The motor driver 8 is an electric circuit including a drive circuit of the MG 10.

When causing the MG 10 to rotate for power running, the motor control unit 5 instructs the motor driver 8 based on the motor request driving force to cause the MG 10 to rotate for power running. When causing the MG 10 to rotate for regeneration, the motor control unit 5 instructs the motor driver 8 based on the motor request driving force to cause the MG 10 to rotate for regeneration.

Although illustration is omitted, the vehicle control system 1 includes a traveling battery as a power supply of the MG 10. The traveling battery is charged with electric power generated by regenerative rotation of the MG 10.

The traveling stability control unit 6 executes control related to traveling stability of the vehicle, such as vehicle dynamics control (VDC). The traveling stability control unit 6 controls the hydraulic brake as one type of control related to the traveling stability of the vehicle. As the brake control, the traveling stability control unit 6 controls actuators provided as the brake-related actuator 9 based on the request braking force sent from the controller 23. The brake-related actuator 9 includes various actuators related to the brake, such as a fluid pressure control actuator that controls a fluid pressure output from a brake booster to a master cylinder and a fluid pressure in a brake fluid pipe. In one example, the traveling stability control unit 6 controls the fluid pressure control actuator based on the request braking force to brake the driver's vehicle.

In this example, the vehicle control system 1 has the stop keeping function. The stop keeping function is a function of causing the stopped vehicle to keep its stopped state. In one example, when a stopping braking force that is a request braking force at a stop timing is not equal to or larger than a braking force that can keep the vehicle in the stopped state (hereinafter referred to as "stop keeping braking force Tp"), the vehicle is kept in the stopped state by increasing the brake fluid pressure so that the braking force becomes equal to or larger than the stop keeping braking force Tp.

The stop keeping function is described with reference to FIG. 2.

Figure 2:
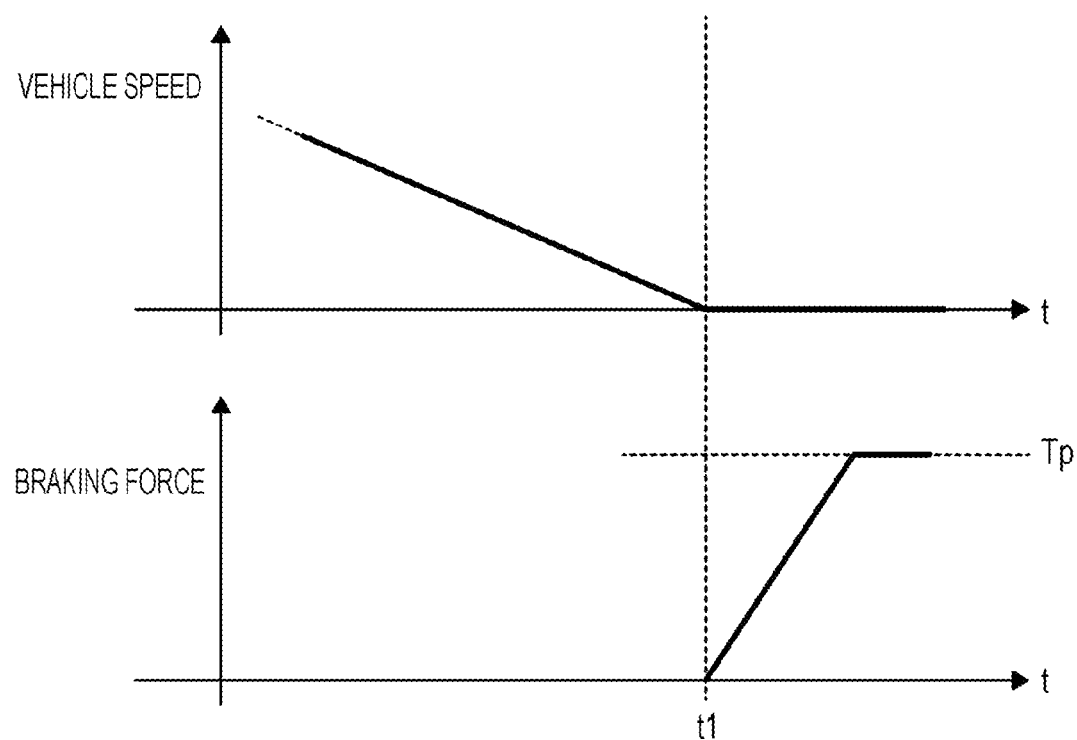
FIG. 2 is a diagram for describing a stop keeping function.

FIG. 2 illustrates transition of the vehicle speed (driver's vehicle speed js) from a time when the vehicle is decelerated to a time when the vehicle is kept in the stopped state, and transition of the braking force after the vehicle is stopped.

In the stop keeping function, when the stopping braking force that is the request braking force at the stop timing is not equal to or larger than the predetermined stop keeping braking force Tp, the vehicle is kept in the stopped state by increasing the brake fluid pressure so that the braking force becomes equal to or larger than the stop keeping braking force Tp.

The stop keeping braking force Tp is a braking force that keeps the stop of the vehicle. The stop keeping braking force Tp may be set to either one of a limit value (lower limit value) of the braking force that keeps the stop of the vehicle, and a value obtained in consideration of a margin for the limit value (limit value+margin).

In this example, a condition related to the vehicle speed is set as a condition for determination as to whether the stop timing has come. In this example, determination is made that the stop timing has come when the vehicle speed is equal to or lower than a first vehicle speed threshold. The first vehicle speed threshold is not limited to a threshold for determining a timing when the vehicle speed is 0 km/h, and may be set to a threshold for determining a timing of a state regarded as the stopped state. For example, the first vehicle speed threshold may be a value within a range of 0 km/h to 1 km/h. In this example, the first vehicle speed threshold is 0.5 km/h.

In FIG. 2, the stop timing is a time t1.

In the stop keeping function, determination is made as to whether the request braking force at the stop timing (stopping braking force) is equal to or larger than the stop keeping braking force Tp. In the example of FIG. 2, the stopping braking force is assumed to be "0". In this case, the stopping braking force is smaller than the stop keeping braking force Tp. Therefore, the request braking force is controlled by the stop keeping function to become equal to or larger than the stop keeping braking force Tp, and the brake fluid pressure is increased to become equal to or larger than the fluid pressure that keeps the stop. The stop of the vehicle is kept by the increased brake fluid pressure.

In the stop keeping function of this example, when the stopping braking force is equal to or larger than the stop keeping braking force Tp, the request braking force is kept at the stopping braking force.

In this example, the traveling stability control unit 6 executes processes for implementing the stop keeping function, such as processes for determining whether the stop timing has come, determining whether to increase the pressure based on the stop keeping braking force Tp, and controlling the increase in the brake fluid pressure in the case of increasing the pressure.

The processes for implementing the stop keeping function may be executed not only by the traveling stability control unit 6 but also by, for example, the controller 23 or other computers.

Next, the pressure pre-increasing process according to the embodiment is described.

Figure 3:
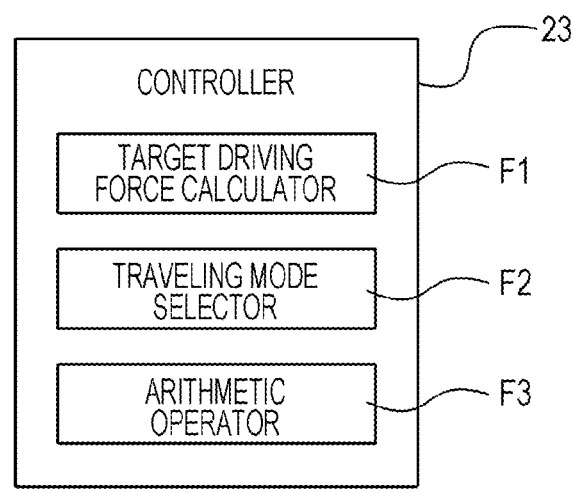
FIG. 3 is a functional block diagram for describing a pressure pre-increasing process according to the embodiment.

FIG. 3 is a functional block diagram for describing the pressure pre-increasing process according to the embodiment. FIG. 3 illustrates functional blocks related to the pressure pre-increasing process in the controller 23 of the driving assistance control unit 2.

As illustrated in FIG. 3, the controller 23 includes a target driving force calculator F1, a traveling mode selector F2, and an arithmetic operator F3.

The target driving force calculator F1 calculates the target driving force.

The traveling mode selector F2 selects either one of an engine traveling mode and an electric vehicle (EV) traveling mode as a traveling mode of the vehicle. In the engine traveling mode, the vehicle travels by operating the engine. In the EV traveling mode, the vehicle travels by using the MG 10 with the engine stopped.

In the hybrid electric vehicle, various known methods are available as a method for selecting either one of the engine traveling mode and the EV traveling mode, and the method is not limited to any specific method.

The arithmetic operator F3 calculates, based on the target driving force, a request driving force to be used for controlling drive of the MG 10, and a request braking force to be used for controlling the hydraulic brake.

As the pressure pre-increasing process, the arithmetic operator F3 executes a process of pre-increasing the brake fluid pressure before the stop timing. In one example, the pressure pre-increasing process is a process of pre-increasing the brake fluid pressure before the stop timing and setting, as the request driving force, a cancellation driving force for canceling the braking force for the pressure pre-increase.

Figure 4:
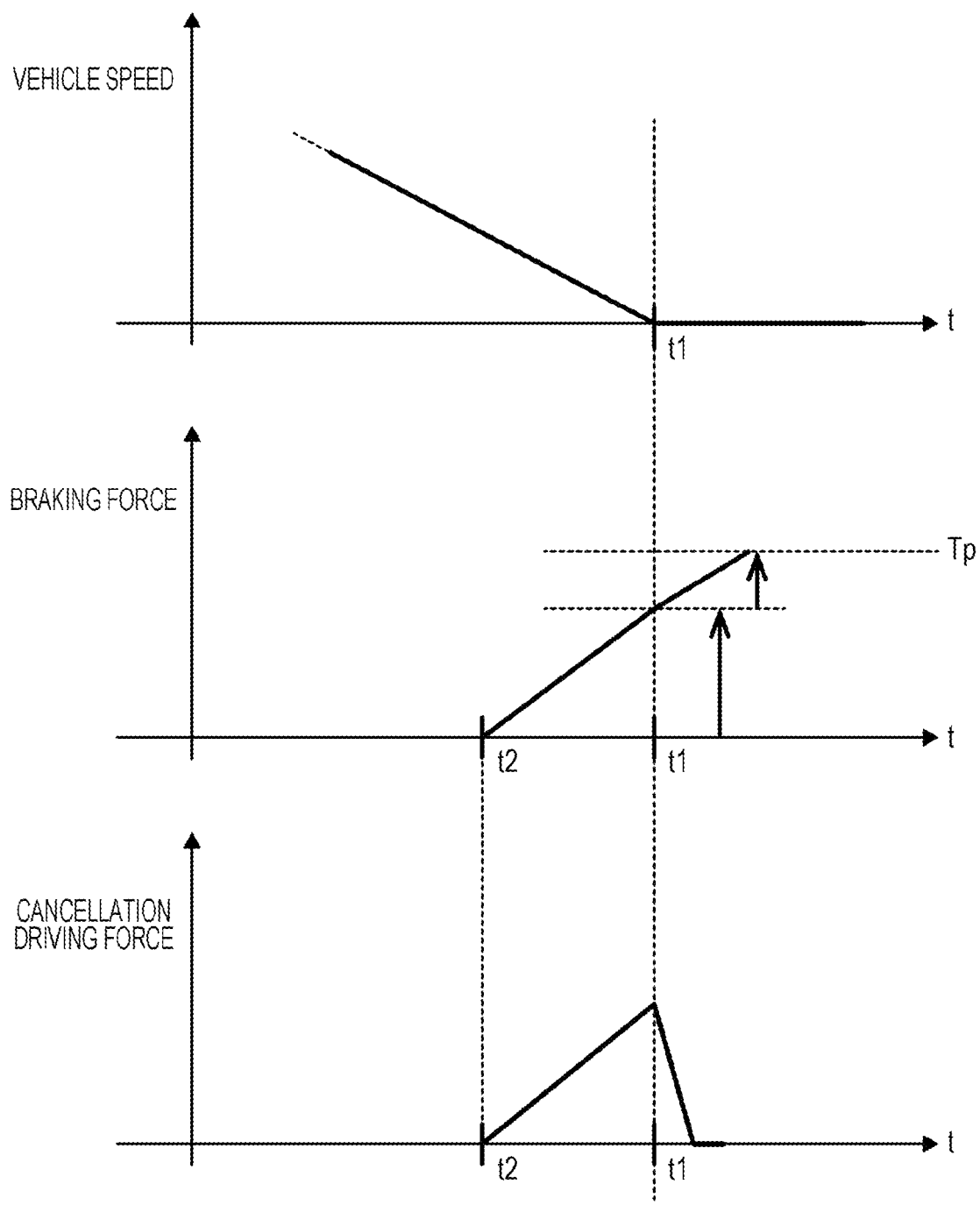
FIG. 4 is a diagram for describing an overview of the pressure pre-increasing process.

FIG. 4 is a diagram for describing an overview of the pressure pre-increasing process. FIG. 4 illustrates transition of the vehicle speed, the braking force, and the cancellation driving force in a period in which the vehicle is gradually decelerated and kept in the stopped state by the stop keeping function.

In this example, the pressure pre-increasing process is started from a timing immediately before the stop timing. Determination as to whether the timing immediately before the stop has come is made based on whether the accelerator is OFF and the vehicle speed is equal to or lower than a second vehicle speed threshold. The second vehicle speed threshold is set higher than the first vehicle speed threshold. For example, the second vehicle speed threshold may be set within a range of 2 km/h to 10 km/h.

In FIG. 4, the timing immediately before the stop based on the second vehicle speed threshold and the vehicle speed is a time t2.

At the timing immediately before the stop (time t2), the braking force is assumed to be "0". In this case, the pressure pre-increasing process is executed to gradually increase the braking force toward the stop timing (time t1). In the pressure pre-increasing process, a driving force for canceling the braking force is simultaneously output as indicated by the transition of the cancellation driving force in FIG. 4. In one example, the cancellation driving force is set as the request driving force. Thus, the request driving force agrees with the target driving force.

Through the pressure pre-increasing process, the stopping braking force at the stop timing can be increased, thereby reducing a fluid pressure increase amount in the case where the braking force is increased to the stop keeping braking force Tp by the stop keeping function. That is, actuation noise and vibration of the motor that increases the stop keeping brake fluid pressure can be reduced, thereby improving the Noise Vibe (NV) performance related to the stop keeping function.

To increase the NV performance, it is desirable to increase the stopping braking force to become equal to or larger than the stop keeping braking force Tp, that is, set the fluid pressure increase amount to "0". In this case, however, the cancellation driving force is excessively large to cause a possibility of a decrease in either one of the fuel efficiency and the electricity efficiency.

In this embodiment, the arithmetic operator F3 executes the following control in the pressure pre-increasing process. That is, the request braking force is controlled so that the braking force for the pressure pre-increase is increased within a range in which the braking force does not exceed an NV braking force threshold Nth smaller than the stop keeping braking force Tp.

Figure 5:
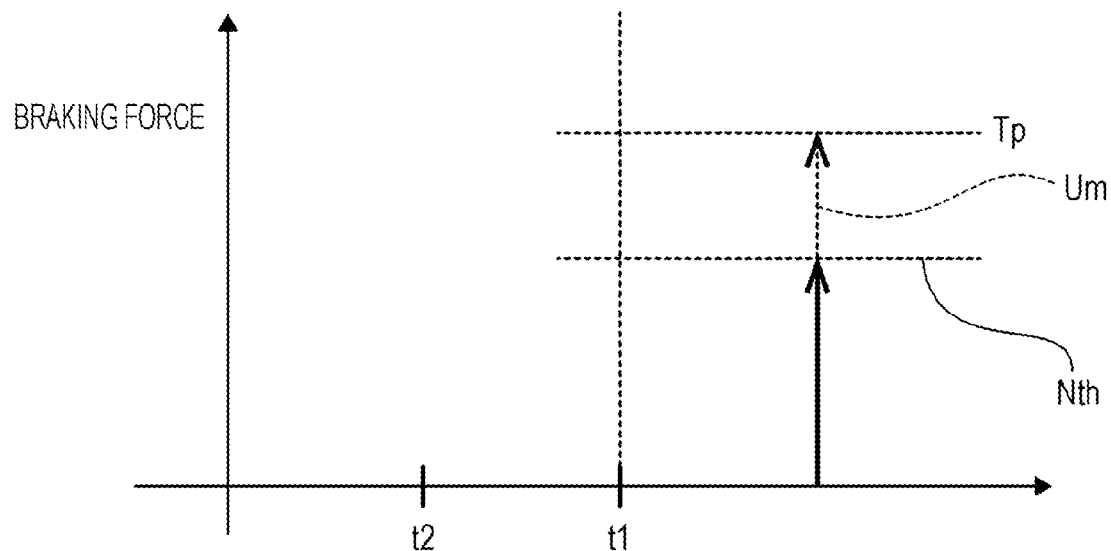
FIG. 5 is a diagram for describing a braking force threshold according to the embodiment.

FIG. 5 is a diagram for describing the NV braking force threshold Nth.

In this example, the NV braking force threshold Nth is calculated based on the stop keeping braking force Tp and a post-stop permissible braking force increase amount Um. The post-stop permissible braking force increase amount Um is a permissible amount of the increase in the braking force at the time of keeping the stop of the vehicle. By appropriately setting the increase after the stop, it is possible to reduce the possibility that the NV performance at the time of keeping the stop is lower than permissible performance.

In this example, the NV braking force threshold Nth is calculated by subtracting the post-stop permissible braking force increase amount from the stop keeping braking force. That is, "NV braking force threshold Nth=stop keeping braking force Tp−post-stop permissible braking force increase amount Um".

Therefore, the NV braking force threshold Nth is smaller than the stop keeping braking force Tp. In the pressure pre-increasing process, the increase in the braking force is stopped at a braking force smaller than the stop keeping braking force Tp. Thus, the excessive increase in the cancellation driving force is suppressed, thereby suppressing the decrease in either one of the fuel efficiency and the electricity efficiency.

By calculating the NV braking force threshold Nth, the amount of increase in the braking force after the stop (that is, the amount of increase in the braking force by the stop keeping function) does not exceed the post-stop permissible braking force increase amount Um, thereby reducing the possibility that the NV performance is lower than the permissible performance.

In this example, the arithmetic operator F3 controls the amount of increase in the braking force in the pressure pre-increasing process based on the cancellation driving force to increase the effect of suppressing the decrease in either one of the fuel efficiency and the electricity efficiency. In one example, the arithmetic operator F3 controls the request braking force so that the braking force for the pressure pre-increase is increased within a range in which the cancellation driving force does not exceed a predetermined upper limit cancellation driving force Dth.

Figure 6:
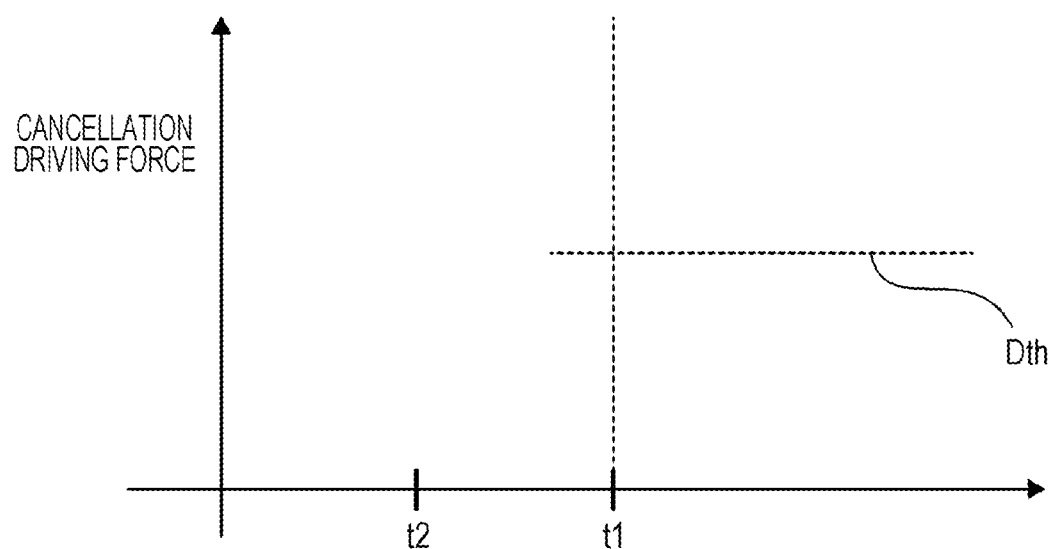
FIG. 6 is a diagram for describing an upper limit cancellation driving force according to the embodiment.

FIG. 6 is a diagram for describing the upper limit cancellation driving force Dth.

The upper limit cancellation driving force Dth is an upper limit of the cancellation driving force. By setting the upper limit cancellation driving force Dth and controlling the cancellation driving force not to exceed the upper limit cancellation driving force Dth, it is possible to reduce the possibility that the cancellation driving force exceeds an upper limit value permissible from the viewpoint of either one of the fuel efficiency and the electricity efficiency.

In this example, when the gradient of a traveling road of the vehicle is large, the arithmetic operator F3 controls the post-stop permissible braking force increase amount Um to become larger than when the gradient is small.

Information on the gradient may be either one of real-time information detected by the gradient sensor, and information on a predicted gradient at the stop timing. For example, the gradient can be predicted through the image recognition process by the image processor 22.

Figure 7:
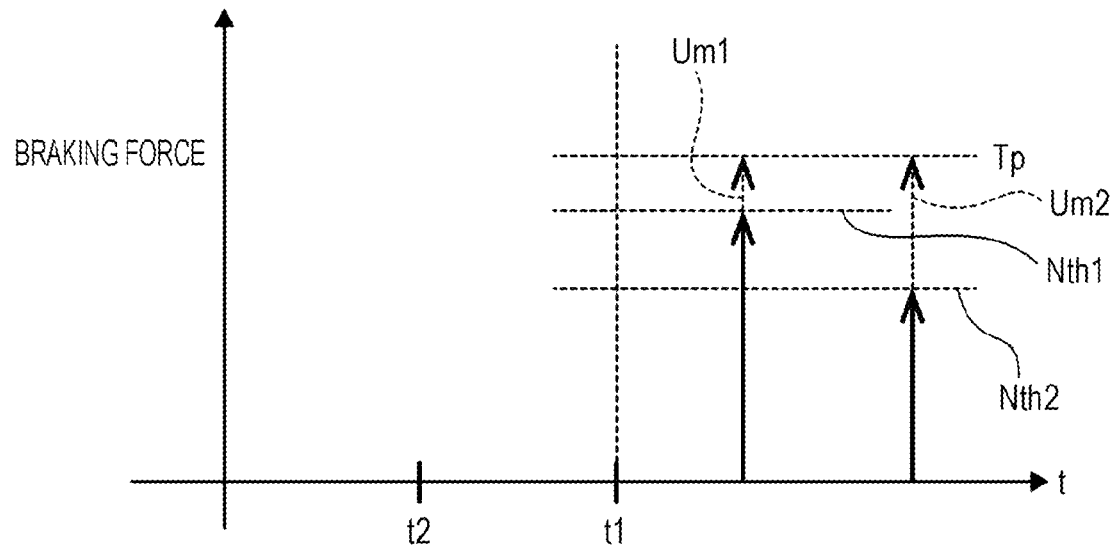
FIG. 7 is a diagram for describing an example of setting of a post-stop permissible braking force increase amount depending on a gradient.

FIG. 7 is a diagram illustrating a post-stop permissible braking force increase amount Um1 at the small gradient, and a post-stop permissible braking force increase amount Um2 at the large gradient.

As illustrated in FIG. 7, the post-stop permissible braking force increase amount Um2 at the large gradient is larger than the post-stop permissible braking force increase amount Um1 at the small gradient. An NV braking force threshold Nth calculated based on the post-stop permissible braking force increase amount Um1 at the small gradient is represented by "Nth1". An NV braking force threshold Nth calculated based on the post-stop permissible braking force increase amount Um2 at the large gradient is represented by "Nth2".

When the gradient of the traveling road is large, the stop keeping braking force Tp is set to a large value. When the post-stop permissible braking force increase amount Um is not increased though the stop keeping braking force Tp is increased, the NV braking force threshold Nth calculated by "stop keeping braking force Tp−post-stop permissible braking force increase amount Um" increases and the cancellation driving force increases. Therefore, the consumption of fuel and electric power for canceling the pre-increase amount may increase. In this example, the post-stop permissible braking force increase amount Um is increased at the large gradient to reduce the possibility that the NV braking force threshold Nth is excessively large.

Thus, the decrease in either one of the fuel efficiency and the electricity efficiency can be suppressed when improving the NV performance related to the stop keeping at a slope.

Figure 8:
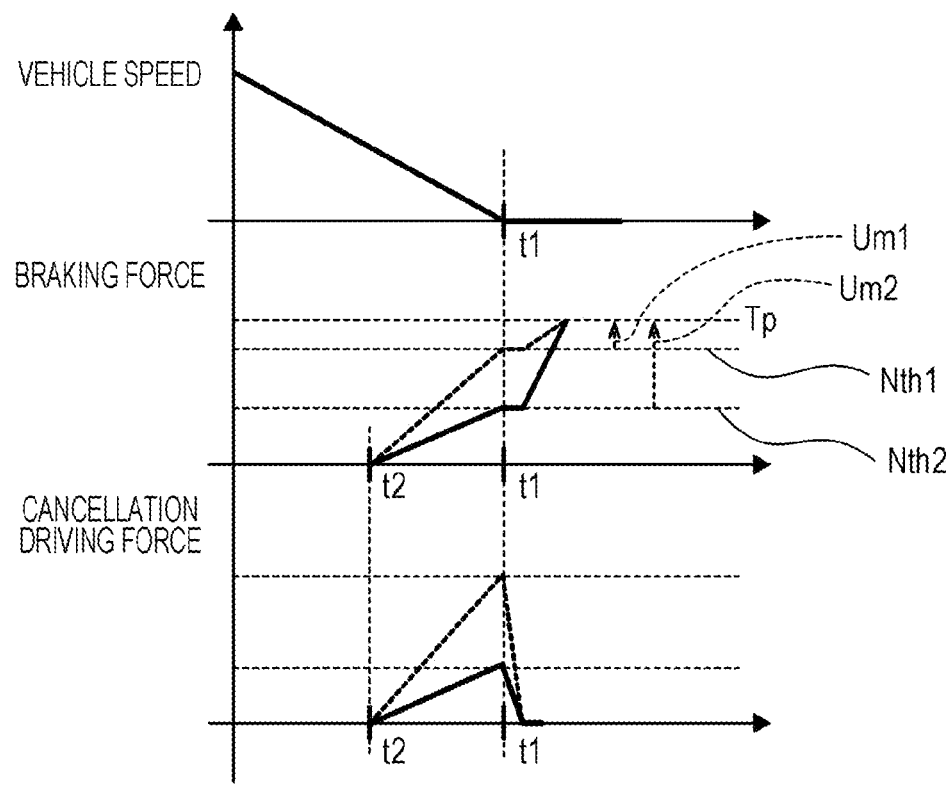
FIG. 8 is a diagram for describing operations of variable control on the post-stop permissible braking force increase amount depending on the gradient.

FIG. 8 is a diagram for describing operations of variable control on the post-stop permissible braking force increase amount Um depending on the gradient.

Regarding the braking force and the cancellation driving force in FIG. 8, the dotted line represents the case where the gradient is small, and the solid line represents the case where the gradient is large. In FIG. 8, in the case where the gradient is large, the amount of increase in the braking force through the pressure pre-increasing process is reduced. Along with the reduction, the amount of increase in the cancellation driving force is reduced.

In this example, the arithmetic operator F3 controls the braking force in the pressure pre-increasing process depending on the comfort mode and the ECO mode. In one example, when the ECO mode is set, the arithmetic operator F3 controls the upper limit cancellation driving force Dth to become smaller than when the comfort mode is set.

Figure 9:
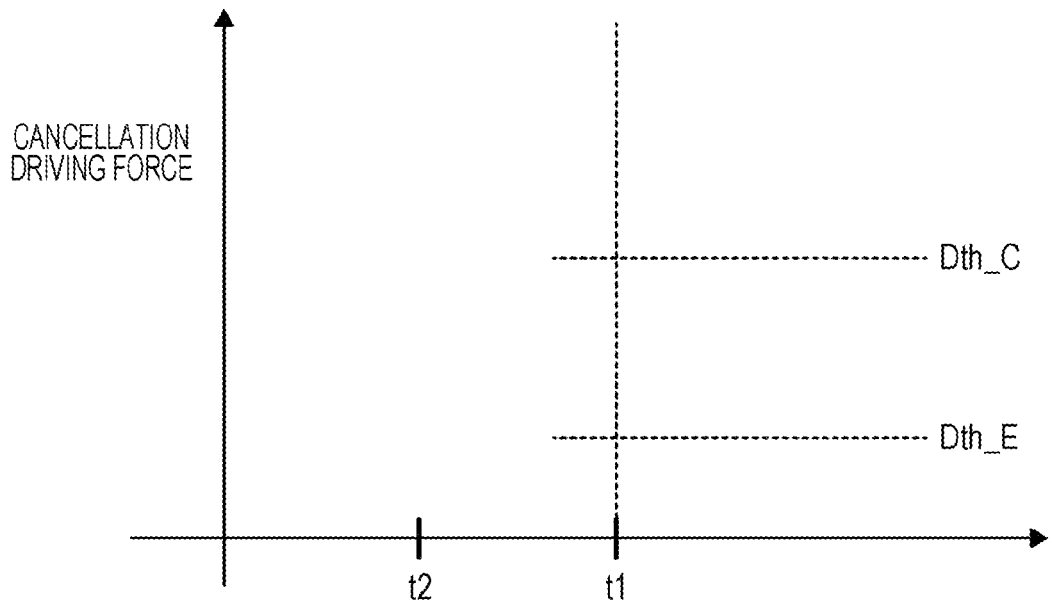
FIG. 9 is a diagram illustrating a relationship between an upper limit cancellation driving force to be set in a second mode (ECO mode) and an upper limit cancellation driving force to be set in a first mode (comfort mode)

FIG. 9 illustrates a relationship between an upper limit cancellation driving force Dth_E to be set in the ECO mode and an upper limit cancellation driving force Dth_C to be set in the comfort mode.

Figure 10:
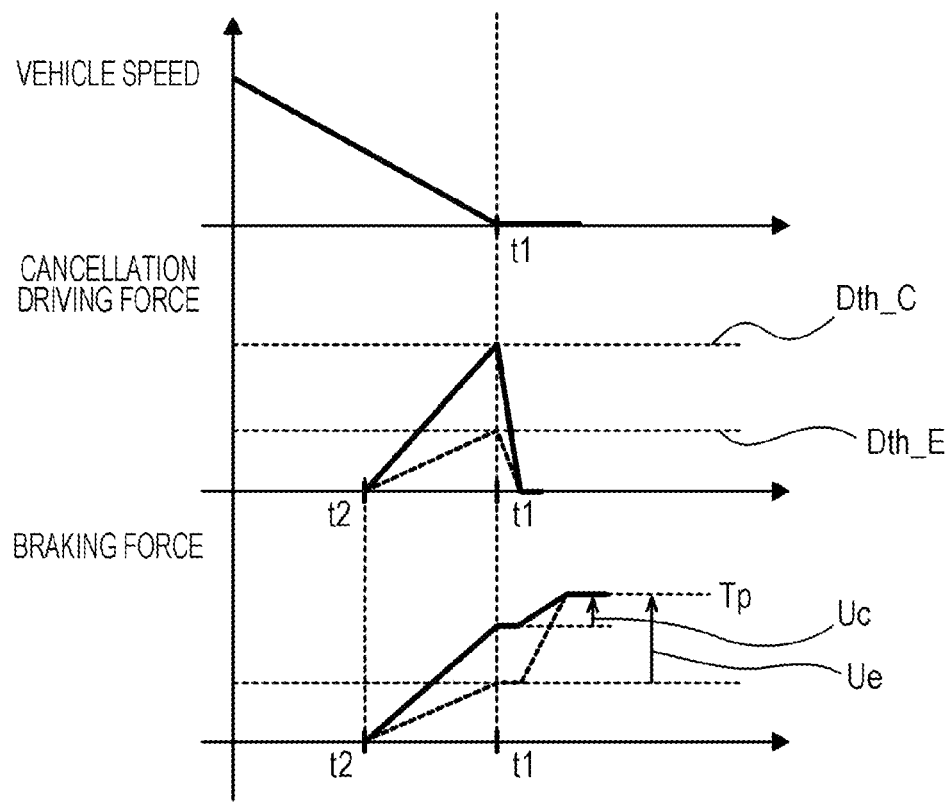
FIG. 10 is a diagram for describing operations of setting of the upper limit cancellation driving force for each of the first mode and the second mode.

FIG. 10 is a diagram for describing operations of setting of the upper limit cancellation driving forces Dth_E and Dth_C.

Regarding the cancellation driving force and the braking force in FIG. 10, the dotted line represents the case of the ECO mode, and the solid line represents the case of the comfort mode.

In this example, the braking force for the pressure pre-increase is controlled so that the cancellation driving force does not exceed the upper limit cancellation driving force Dth. In the ECO mode in which the upper limit cancellation driving force Dth_E is small, the increase in the cancellation driving force in the pressure pre-increasing process is suppressed, thereby increasing the effect of suppressing the decrease in either one of the fuel efficiency and the electricity efficiency.

In the comfort mode in which the upper limit cancellation driving force Dth_C is large, the amount of increase in the braking force in the pressure pre-increasing process increases. A braking force increase amount for the increase in the fluid pressure by the stop keeping function is represented by "U". In FIG. 10, a braking force increase amount U in the ECO mode is represented by "Ue", and a braking force increase amount U in the comfort mode is represented by "Uc". In the comfort mode in which the amount of increase in the braking force in the pressure pre-increasing process increases, the braking force increase amount U is small (Uc<Ue). That is, the amount of increase in the fluid pressure by the stop keeping function can be reduced, thereby increasing, in the comfort mode, the effect of reducing noise and vibration when the stop keeping function is exerted.

In this example, the arithmetic operator F3 controls the braking force in the pressure pre-increasing process depending on the engine traveling mode and the EV traveling mode. In one example, in the engine traveling mode, the arithmetic operator F3 controls the NV braking force threshold Nth to become smaller than in the EV traveling mode.

Figure 11:
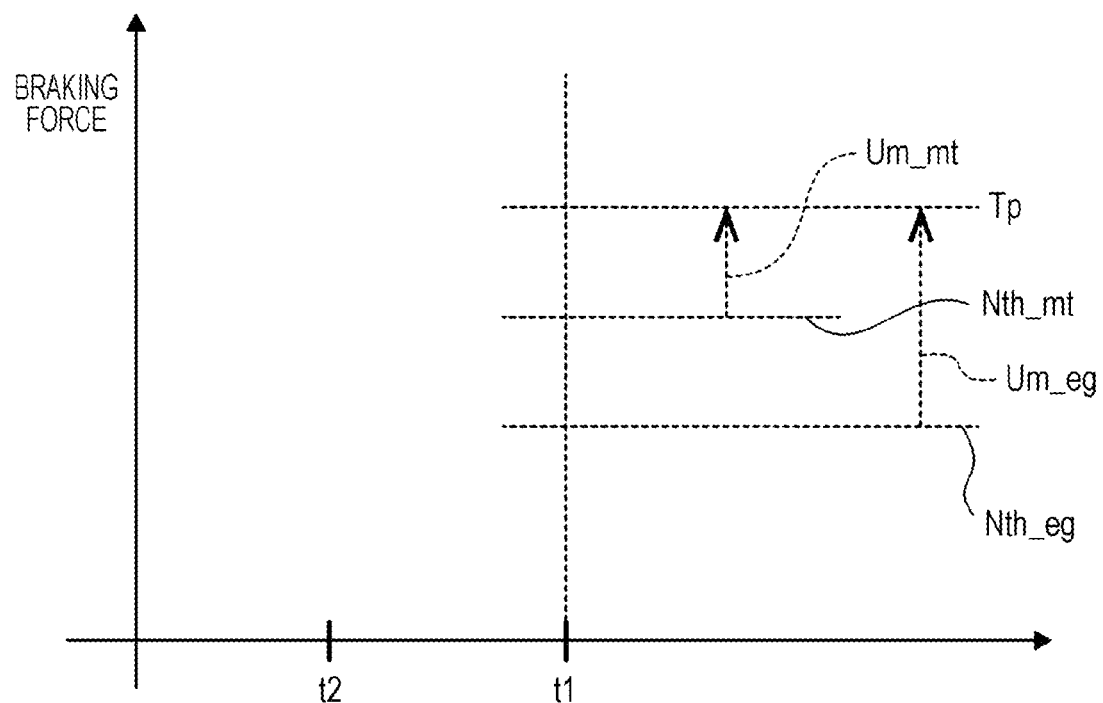
FIG. 11 is a diagram illustrating a relationship between braking force thresholds to be set in an engine traveling mode and an EV traveling mode.

FIG. 11 illustrates a relationship between an NV braking force threshold Nth_eg to be set in the engine traveling mode and an NV braking force threshold Nth_mt to be set in the EV traveling mode.

In this example, the NV braking force thresholds Nth_eg and Nth_mt are calculated by using post-stop permissible braking force increase amounts Um for the engine traveling mode and the EV traveling mode, respectively.

In the example of FIG. 11, the post-stop permissible braking force increase amount Um for the engine traveling mode is represented by "Um_eg", and the post-stop permissible braking force increase amount Um for the EV traveling mode is represented by "Um_mt". In this case, "Um_eg>Um_mt".

The NV braking force threshold Nth_eg for the engine traveling mode is calculated by using the stop keeping braking force Tp and the post-stop permissible braking force increase amount Um_eg ("Nth_eg=Tp−Um_eg"). The NV braking force threshold Nth_mt for the EV traveling mode is calculated by using the stop keeping braking force Tp and the post-stop permissible braking force increase amount Um_mt ("Nth_mt=Tp−Um_mt").

In the engine traveling mode, the occupant is unlikely to perceive, due to influence of engine noise, the motor actuation noise along with the increase in the fluid pressure at the time of keeping the stop. Therefore, in the engine traveling mode, the cancellation driving force at the time of pressure pre-increase is reduced by reducing the NV braking force threshold Nth_eg. Thus, the fuel consumption of the engine at the time of pressure pre-increase can be reduced, thereby suppressing the decrease in the fuel efficiency.

An example of a specific processing procedure of the pressure pre-increasing process according to the embodiment is described with reference to FIG. 12 and FIG. 13.

Figure 12:
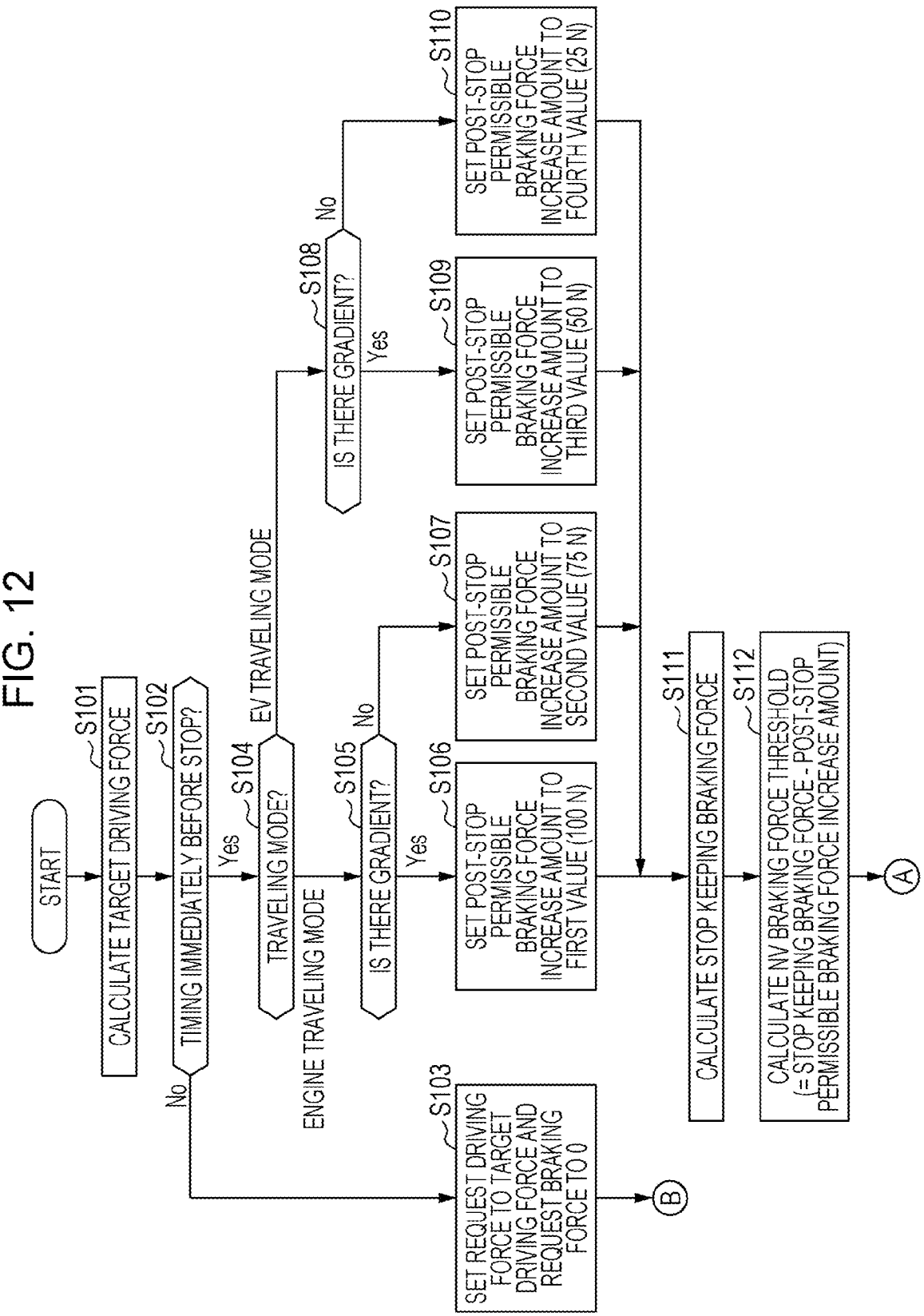
FIG. 12 is a flowchart illustrating an example of a specific processing procedure of the pressure pre-increasing process according to the embodiment.
Figure 13:
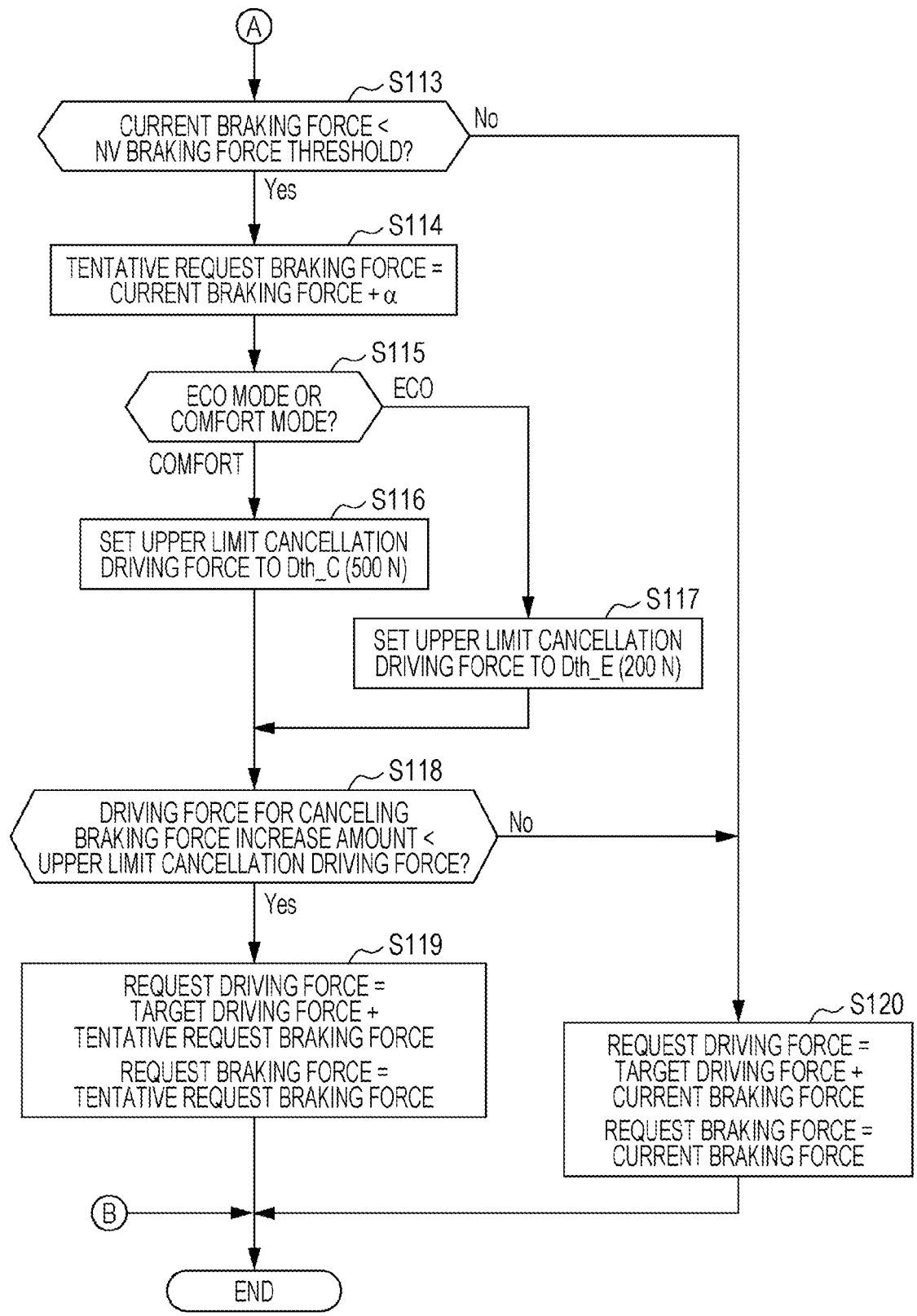
FIG. 13 is a flowchart illustrating, together with FIG. 12, the example of the specific processing procedure of the pressure pre-increasing process according to the embodiment.

In this example, a series of processes illustrated in FIG. 12 and FIG. 13 is executed by the controller 23 based on a program stored in a predetermined storage such as a ROM. For example, the controller 23 executes the series of processes illustrated in FIG. 12 and FIG. 13 in every predetermined period. Thus, the controller 23 repeats the series of processes with intervals in a time direction.

In Step S101 of FIG. 12, the controller 23 calculates a target driving force. During the ACC, the target driving force is calculated as a target value for implementing each of the constant speed traveling control and the follow-traveling control. In a state other than the ACC, the target driving force is calculated based on driver's operations for the accelerator and the brake.

In Step S102 subsequent to Step S101, the controller 23 determines whether a timing immediately before a stop has come. In this example, the controller 23 determines whether the accelerator is OFF and the vehicle speed is equal to or lower than the second vehicle speed threshold.

When determination is made in Step S102 that the timing immediately before the stop has not come, the controller 23 proceeds to Step S103 to set a request driving force to the target driving force and a request braking force to "0". Then, the controller 23 terminates the series of processes illustrated in FIG. 12 and FIG. 13.

That is, the braking force and the cancellation driving force for the pressure pre-increase are not controlled prior to the timing immediately before the stop (time t2).

When determination is made in Step S102 that the timing immediately before the stop has come, the controller 23 proceeds to Step S104 to check the traveling mode. That is, the controller 23 determines whether a current traveling mode is the engine traveling mode or the EV traveling mode.

When determination is made in Step S104 that the traveling mode is the engine traveling mode, the controller 23 proceeds to Step S105 to determine whether the traveling road has a gradient. In this example, the controller 23 determines whether the value (%) of the gradient of the traveling road that is detected by the gradient sensor is equal to or higher than a predetermined value (for example, 3% or higher as an absolute value).

When determination is made in Step S105 that the traveling road has a gradient, the controller 23 proceeds to Step S106 to set the post-stop permissible braking force increase amount Um to a first value (for example, a value corresponding to 100 N: N represents "newton"). Then, the controller 23 proceeds to Step S111.

When determination is made that the traveling road has no gradient, the controller 23 proceeds to Step S107 from Step S105 to set the post-stop permissible braking force increase amount Um to a second value (for example, a value corresponding to 75 N). Then, the controller 23 proceeds to Step S111.

When determination is made in Step S104 that the traveling mode is the EV traveling mode, the controller 23 proceeds to Step S108 to determine whether the traveling road has a gradient through a process similar to that of Step S105.

When determination is made in Step S108 that the traveling road has a gradient, the controller 23 proceeds to Step S109 to set the post-stop permissible braking force increase amount Um to a third value (for example, a value corresponding to 50 N). Then, the controller 23 proceeds to Step S111.

When determination is made in Step S108 that the traveling road has no gradient, the controller 23 proceeds to Step S110 to set the post-stop permissible braking force increase amount Um to a fourth value (for example, a value corresponding to 25 N). Then, the controller 23 proceeds to Step S111.

Comparison between the pair of Steps S106 and S107 and the pair of Steps S109 and S110 demonstrates the following fact. In this example, the post-stop permissible braking force increase amount Um is set larger in the engine traveling mode than in the EV traveling mode. That is, the NV braking force threshold Nth is set smaller in the engine traveling mode than in the EV traveling mode (see FIG. 11).

Comparison between Steps S106 and S107 and comparison between Steps S109 and S110 demonstrate the following fact. In this example, the post-stop permissible braking force increase amount Um is set larger at a large gradient (the traveling road has a gradient, that is, the traveling road is a slope) than at a small gradient (the traveling road has no gradient, that is, the traveling road is a flat road) (see FIG. 7 and FIG. 8).

In the processes of Steps S106, S107, S109, and S110, the post-stop permissible braking force increase amount Um may be set to either one of a value of brake fluid pressure (mpa) and a value of electric power (kW) corresponding to the post-stop permissible braking force increase amount Um. For example, in the case of electric power, the post-stop permissible braking force increase amount Um may be set to 1 kW, 0.75 kW, 0.5 kW, and 0.25 kW in S106, S107, S109, and S110, respectively.

Processes of Step S111 and Step S112 subsequent thereto are executed to calculate an NV braking force threshold Nth based on the set post-stop permissible braking force increase amount Um.

In one example, the controller 23 calculates a stop keeping braking force Tp in Step S111. For example, the stop keeping braking force Tp is calculated based on information on the gradient.

In Step S112, the controller 23 calculates an NV braking force threshold Nth. In one example, calculation is executed based on "NV braking force threshold Nth=stop keeping braking force Tp−post-stop permissible braking force increase amount Um".

In response to the calculation of the NV braking force threshold Nth in Step S112, the controller 23 proceeds to Step S113 of FIG. 13.

In Step S113 of FIG. 13, the controller 23 determines whether a current braking force is smaller than the NV braking force threshold Nth. The current braking force is a braking force being output based on the request braking force.

When determination is made in Step S113 that the current braking force is smaller than the NV braking force threshold Nth, the controller 23 proceeds to Step S114 to set a tentative request braking force to "current braking force+a".

In this example, the pressure pre-increasing process is executed by gradually increasing the braking force from the timing immediately before the stop. The value "a" indicates an amount of the gradual increase in the braking force (per unit time). As described above, the series of processes illustrated in FIG. 12 and FIG. 13 is repeated. When the process of Step S114 is executed each time, the braking force is increased by a to gradually approach the NV braking force threshold Nth.

The value a may be either one of a fixed value and a variable. When the value a is a fixed value, the rate of increase in the braking force in the pressure pre-increasing process may be variable under a given condition.

In Step S114, the controller 23 uses the value a to set the tentative request braking force to "current braking force+a".

The term "tentative" is used because of a possibility that the value calculated in Step S114 is not set as the request braking force through a branching process in Step S118 described later.

When determination is made in Step S113 that the current braking force is not smaller than the NV braking force threshold Nth, the controller 23 proceeds to Step S120 to set the request driving force to "target driving force+current braking force" and the request braking force to the current braking force. Then, the controller 23 terminates the series of processes illustrated in FIG. 12 and FIG. 13.

Thus, when the current braking force has reached the NV braking force threshold Nth, the braking force stops increasing by a, and the fluid pressure increase through the pressure pre-increasing process is completed.

When determination is made that the current braking force is smaller than the NV braking force threshold Nth and the process of Step S114 is executed, the controller 23 proceeds to Step S115.

In Step S115, the controller 23 determines whether the mode is the ECO mode or the comfort mode. When determination is made in Step S115 that the mode is the comfort mode, the controller 23 sets the upper limit cancellation driving force Dth to "Dth_C" (for example, 500 N) in Step S116, and proceeds to Step S118.

When determination is made in Step S115 that the mode is the ECO mode, the controller 23 sets the upper limit cancellation driving force Dth to "Dth_E" (for example, 200 N) in Step S117, and proceeds to Step S118.

In the processes of Steps S116 and S117, the upper limit cancellation driving force may be set to either one of a value of brake fluid pressure and a value of electric power corresponding to the upper limit cancellation driving force. For example, in the case of electric power, the upper limit cancellation driving force may be set to 5 kW in S116 and 2 kW in S117.

In Step S118, the controller 23 determines whether the driving force for canceling the amount of increase in the braking force is smaller than the upper limit cancellation driving force Dth. That is, the controller 23 determines whether the tentative request braking force set in Step S114 is smaller than the upper limit cancellation driving force Dth set in either one of Steps S116 and S117.

When determination is made in Step S118 that the driving force for canceling the amount of increase in the braking force is smaller than the upper limit cancellation driving force Dth, the controller 23 proceeds to Step S119 to set the request driving force to "target driving force+tentative request braking force" and the request braking force to the tentative request braking force. Then, the controller 23 terminates the series of processes illustrated in FIG. 12 and FIG. 13.

That is, when the "tentative request braking force" set in Step S114 has not reached the upper limit cancellation driving force Dth, the request braking force is set to the "tentative request braking force", and the current braking force is increased by a braking force corresponding to "a".

When determination is made in Step S118 that the driving force for canceling the amount of increase in the braking force is not smaller than the upper limit cancellation driving force Dth, the controller 23 proceeds to Step S120 to set the request driving force to "target driving force+current braking force" and the request braking force to the current braking force. Then, the controller 23 terminates the series of processes illustrated in FIG. 12 and FIG. 13.

That is, when the "tentative request braking force" has reached the upper limit cancellation driving force Dth, the braking force stops increasing by a, and the fluid pressure increase through the pressure pre-increasing process is completed.

The embodiment is not limited to the specific examples described above, and various modified examples may be adopted.

In the examples described above, the pressure pre-increasing process according to the embodiment is applied to the stop of the vehicle during the ACC. The pressure pre-increasing process is also applicable to either one of a stop of a vehicle in an autonomous driving technology and a stop of a vehicle in use of a one-pedal function. The one-pedal function is a function of accelerating or decelerating a vehicle based on an operation for one pedal.

In the examples described above, the vehicle control system according to the embodiment of the disclosure is applied to the hybrid electric vehicle. The vehicle control system according to the embodiment of the disclosure is also suitably applicable to either one of an EV without an engine and an engine vehicle that does not include a motor as a drive source of wheels.

As described above, the vehicle control system (1) according to the embodiment is the vehicle control system for the vehicle including either one of the engine and the motor as the drive source of the wheels of the vehicle. The vehicle control system includes the target driving force calculator (F1) configured to calculate the target driving force of the vehicle, the arithmetic operator (F3) configured to calculate, based on the target driving force, the request driving force to be used for controlling drive of either one of the engine and the motor, and the request braking force to be used for controlling the hydraulic brake, and a stop keeping processor (for example, the traveling stability control unit 6) configured to execute, when the stopping braking force that is the request braking force at the stop timing is not equal to or larger than the stop keeping braking force that keeps the vehicle in the stopped state, the process of keeping the vehicle in the stopped state by increasing the brake fluid pressure so that the braking force becomes equal to or larger than the stop keeping braking force. The arithmetic operator executes the pressure pre-increasing process for pre-increasing the brake fluid pressure before the stop timing and setting, as the request driving force, the cancellation driving force for canceling the braking force for the pressure pre-increase. The arithmetic operator controls, in the pressure pre-increasing process, the request braking force so that the braking force for the pressure pre-increase is increased within the range in which the braking force does not exceed the braking force threshold smaller than the stop keeping braking force.

Through the pressure pre-increasing process, the amount of increase in the fluid pressure by the stop keeping function after the stop can be reduced, thereby improving the NV performance. In the pressure pre-increasing process, the braking force for the pressure pre-increase is not increased to the stop keeping braking force but is increased to the braking force smaller than the stop keeping braking force. Therefore, the excessive increase in the cancellation driving force is suppressed, thereby suppressing the decrease in either one of the fuel efficiency and the electricity efficiency.

Thus, the NV performance in the stop keeping function of the vehicle can be improved while suppressing the decrease in either one of the fuel efficiency and the electricity efficiency.

In the vehicle control system according to the embodiment, the arithmetic operator controls the request braking force so that the braking force for the pressure pre-increase is increased within the range in which the cancellation driving force does not exceed the predetermined upper limit cancellation driving force (see Steps S118 to S120).

Therefore, it is possible to reduce the possibility that the cancellation driving force exceeds the upper limit driving force permissible from the viewpoint of either one of the fuel efficiency and the electricity efficiency.

Thus, it is possible to increase the effect of suppressing the decrease in either one of the fuel efficiency and the electricity efficiency.

In the vehicle control system according to the embodiment, the first mode (comfort mode) focusing on the occupant's comfort and the second mode (ECO mode) focusing on either one of the fuel efficiency and the electricity efficiency can be set as the modes related to the control on the vehicle. The arithmetic operator sets the upper limit cancellation driving force to become smaller in the case where the second mode is set than in the case where the first mode is set (see Steps S115 to S117).

In the second mode focusing on either one of the fuel efficiency and the electricity efficiency, the increase in the cancellation driving force can be suppressed by reducing the upper limit cancellation driving force. In the first mode focusing on the occupant's comfort, the amount of increase in the fluid pressure at the time of keeping the stop can be reduced by increasing the upper limit cancellation driving force, that is, increasing the amount of pressure pre-increase.

Thus, it is possible to achieve an appropriate pressure pre-increasing process adapted to the characteristics of the first and second modes.

In the vehicle control system according to the embodiment, the arithmetic operator calculates the braking force threshold by subtracting the post-stop permissible braking force increase amount from the stop keeping braking force (see Step S112).

The post-stop permissible braking force increase amount is a permissible amount of the increase in the braking force at the time of keeping the stop of the vehicle.

By calculating the braking force threshold by subtracting the post-stop permissible braking force increase amount from the stop keeping braking force, it is possible to reduce the possibility that the NV performance is lower than the permissible performance.

In the vehicle control system according to the embodiment, the arithmetic operator sets the post-stop permissible braking force increase amount to become larger in the case where the gradient of the traveling road of the vehicle is large than in the case where the gradient of the traveling road of the vehicle is small (see Steps S105 to S110).

When the gradient of the traveling road is large, the stop keeping braking force is set to a large value. When the post-stop permissible braking force increase amount is not increased though the stop keeping braking force is increased, the braking force threshold calculated by "stop keeping braking force–post-stop permissible braking force increase amount" increases and the cancellation driving force increases. Therefore, the consumption of fuel and electric power for canceling the pre-increase amount may increase. When the gradient is large, the post-stop permissible braking force increase amount is increased to reduce the possibility that the braking force threshold is excessively large.

Thus, the decrease in either one of the fuel efficiency and the electricity efficiency can be suppressed when improving the NV performance related to the stop keeping at a slope.

In the vehicle control system according to the embodiment, the vehicle is the hybrid electric vehicle including the engine and the motor as the drive sources of the wheels. The engine traveling mode in which the wheels are driven by operating the engine and the EV traveling mode in which the wheels are driven by using the motor with the engine stopped can be set. In the pressure pre-increasing process, the arithmetic operator sets the braking force threshold to become smaller in the engine traveling mode than in the EV traveling mode (see Steps S104 to S110).

In the engine traveling mode, the occupant is unlikely to perceive, due to influence of engine noise, the motor actuation noise along with the increase in the fluid pressure at the time of keeping the stop. Therefore, in the engine traveling mode, the cancellation driving force at the time of pressure pre-increase is reduced by reducing the braking force threshold.

Thus, it is possible to increase the effect of suppressing the decrease in the fuel efficiency.

The controller 23 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 23 including the target driving force calculator F1, the traveling mode selector F2, and the arithmetic operator F3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A vehicle control system for a vehicle, the vehicle comprising one or both of an engine and a motor as a drive source of wheels of the vehicle, the vehicle control system comprising:
 a processor;
 a memory storing instructions for causing the processor to:
  calculate a target driving force of the vehicle; and
  calculate, based on the target driving force, a request driving force to be used for controlling drive of the one or both of the engine and the motor, and a request braking force to be used for controlling a hydraulic brake; and in a case where a stopping braking force that is the request braking force at a stop timing is not equal to or larger than a stop keeping braking force that keeps the vehicle in a stopped state, execute a process of keeping the vehicle in the stopped state by increasing a brake fluid pressure so that a braking force becomes equal to or larger than the stop keeping braking force,
 determine, while the vehicle is traveling, whether a timing immediately before a stop has come;
 in response to determining that the timing immediately before the stop has come, calculate a threshold value for the braking force, the threshold value being smaller than the stop keeping braking force;
 in response to calculating the threshold value, determine whether a current braking force generated by the hydraulic brake is smaller than the threshold value;
 in response to determining that the current braking force is smaller than the threshold value, execute a pressure pre-increasing process for pre-increasing the brake fluid pressure before the stop timing; and in response to determining that the current braking force is not smaller than the threshold value, not execute the pressure pre-increasing process during a period until the stopping timing, wherein the processor is configured to, in the pressure pre-increasing process:

calculate a first value for the request braking force, the first value being smaller than or equal to a value obtained by subtracting the current braking force from the threshold value;

add the first value to the request braking force to increase the brake fluid pressure;

calculate a second value for the request driving force, the second value being a value indicating a canceling driving force that cancels out an increased braking force, the increased braking force being an amount of increase in the braking force by adding the first value to the request braking force; and add the second value to the request driving force.

2. The vehicle control system according to claim 1, wherein a first mode focusing on occupant's comfort and a second mode focusing on one or both of fuel efficiency and electricity efficiency are settable as modes related to control on the vehicle, and wherein the processor is further caused to calculate the threshold value to become smaller in a case where the second mode is set than in a case where the first mode is set.

3. The vehicle control system according to claim 1, wherein the processor is further caused to calculate the threshold value to become smaller in a case where a gradient of a traveling road of the vehicle is large than in a case where the gradient of the traveling road of the vehicle is small.

4. The vehicle control system according to claim 1, wherein the processor is further caused to determine that the timing immediately before the stop has come in a case where i) a vehicle speed of the vehicle is lower or equal to a predetermined value, and ii) the vehicle is not accelerating.

5. The vehicle control system according to claim 4, wherein the drive source includes the engine and the motor, and wherein the processor is further caused to calculate the threshold value to become smaller in a case where a current traveling mode of the vehicle is an engine traveling mode in which the vehicle travels by operating the engine than in a case where the current traveling mode of the vehicle is an electric vehicle traveling mode in which the vehicle travels by using the motor with the engine stopped.

6. The vehicle control system according to claim 5, wherein a first mode focusing on occupant's comfort and a second mode focusing on one or both of fuel efficiency and electricity efficiency are settable as modes related to control on the vehicle, and wherein the processor is further caused to set the threshold value to become smaller in a case where the second mode is set than in a case where the first mode is set.

7. The vehicle control system according to claim 6, wherein the processor is further caused to calculate the threshold value to become smaller in a case where a gradient of a traveling road of the vehicle is large than in a case where the gradient of the traveling road of the vehicle is small.

8. The vehicle control system according to claim 5, wherein the processor is further caused to calculate the threshold value to become smaller in a case where a gradient of a traveling road of the vehicle is large than in a case where the gradient of the traveling road of the vehicle is small.

9. The vehicle control system according to claim 4, wherein a first mode focusing on occupant's comfort and a second mode focusing on one or both of fuel efficiency and electricity efficiency are settable as modes related to control on the vehicle, and wherein the processor is further caused to calculate the threshold value to become smaller in a case where the second mode is set than in a case where the first mode is set.

10. The vehicle control system according to claim 9, wherein the processor is further caused to calculate the threshold value to become smaller in a case where a gradient of a traveling road of the vehicle is large than in a case where the gradient of the traveling road of the vehicle is small.

11. The vehicle control system according to claim 4, wherein the processor is further caused to calculate the threshold value to become smaller in a case where a gradient of a traveling road of the vehicle is large than in a case where the gradient of the traveling road of the vehicle is small.

12. The vehicle control system according to claim 1, wherein the drive source includes the engine and the motor, and wherein the processor is further caused to calculate the threshold value to become smaller in a case where a current traveling mode of the vehicle is an engine traveling mode in which the vehicle travels by operating the engine than in a case where the current traveling mode of the vehicle is an electric vehicle traveling mode in which the vehicle travels by using the motor with the engine stopped.

13. The vehicle control system according to claim 12, wherein a first mode focusing on occupant's comfort and a second mode focusing on one or both of fuel efficiency and electricity efficiency are settable as modes related to control on the vehicle, and wherein the processor is further caused to calculate the threshold value to become smaller in a case where the second mode is set than in a case where the first mode is set.

14. The vehicle control system according to claim 13, wherein the processor is further caused to calculate the threshold value to become smaller in a case where a gradient of a traveling road of the vehicle is large than in a case where the gradient of the traveling road of the vehicle is small.

15. The vehicle control system according to claim 12, wherein the processor is further caused to calculate the threshold value to become smaller in a case where a gradient of a traveling road of the vehicle is large than in a case where the gradient of the traveling road of the vehicle is small.

16. A vehicle control system for a vehicle, the vehicle comprising one or both of an engine and a motor as a drive source of wheels of the vehicle, the vehicle control system comprising circuitry configured to:

calculate a target driving force of the vehicle; and calculate, based on the target driving force, a request driving force to be used for controlling drive of the one or both of the engine and the motor, and a request braking force to be used for controlling a hydraulic brake; and in a case where a stopping braking force that is the request braking force at a stop timing is not equal to or larger than a stop keeping braking force that keeps the vehicle in a stopped state, execute a process of keeping the vehicle in the stopped state by increasing a brake fluid pressure so that a braking force becomes equal to or larger than the stop keeping braking force, determine, while the vehicle is traveling, whether a timing immediately before a stop has come;

in response to determining that the timing immediately before the stop has come, calculate a threshold value for the braking force, the threshold value being smaller than the stop keeping braking force;

in response to calculating the threshold value, determine whether a current braking force generated by the hydraulic brake is smaller than the threshold value;

in response to determining that the current braking force is smaller than the threshold value, execute a pressure pre-increasing process for pre-increasing the brake fluid pressure before the stop timing; and in response to determining that the current braking force is not smaller than the threshold value, not execute the pressure pre-increasing process during a period until the stopping timing, wherein the processor is configured to, in the pressure pre-increasing process:

calculate a first value for the request braking force, the first value being smaller than or equal to a value obtained by subtracting the current braking force from the threshold value;

add the first value to the request braking force to increase the brake fluid pressure;

calculate a second value for the request driving force, the second value being a value indicating a canceling driving force that cancels out an increased braking force, the increased braking force being an amount of increase in the braking force by adding the first value to the request braking force; and 17. The vehicle control system according to claim 16, wherein the circuitry is further configured to determine that the timing immediately before the stop has come in a case where i) a vehicle speed of the vehicle is lower or equal to a predetermined value, and ii) the vehicle is not accelerating.

18. The vehicle control system according to claim 17, wherein the drive source includes the engine and the motor, and wherein the circuitry is further configured to calculate the threshold value to become smaller in a case where a current traveling mode of the vehicle is an engine traveling mode in which the vehicle travels by operating the engine than in a case where the current traveling mode of the vehicle is an electric vehicle traveling mode in which the vehicle travels by using the motor with the engine stopped.

19. The vehicle control system according to claim 18, wherein a first mode focusing on occupant's comfort and a second mode focusing on one or both of fuel efficiency and electricity efficiency are settable as modes related to control on the vehicle, and wherein the circuitry is further configured to calculate the threshold value to become smaller in a case where the second mode is set than in a case where the first mode is set.

20. The vehicle control system according to claim 19, wherein the circuitry is further configured to calculate the threshold value to become smaller in a case where a gradient of a traveling road of the vehicle is large than in a case where the gradient of the traveling road of the vehicle is small.

* * * * *